(12) United States Patent
Bosarge et al.

(10) Patent No.: US 7,963,840 B2
(45) Date of Patent: Jun. 21, 2011

(54) LOTTERY METHOD AND SYSTEM

(76) Inventors: Eric Matthew Bosarge, Gardiner, ME (US); Mary Jane Belladonna, Dresden, ME (US); Debra Diane Michaud, Sidney, ME (US); Christina Mary Matthews, Brunswick, ME (US)

( * ) Notice: Subject to any disclaimer, the term of this patent is extended or adjusted under 35 U.S.C. 154(b) by 952 days.

(21) Appl. No.: 11/853,503

(22) Filed: Sep. 11, 2007

(65) Prior Publication Data

US 2008/0274784 A1 Nov. 6, 2008

Related U.S. Application Data

(60) Provisional application No. 60/927,173, filed on May 3, 2007.

(51) Int. Cl.
*A63F 9/00* (2006.01)
(52) U.S. Cl. ............... 463/16; 463/17; 463/25; 463/26; 463/27; 463/28; 705/14.12; 705/14.15
(58) Field of Classification Search .............. 463/16–17, 463/25–28; 705/14.12, 14.15
See application file for complete search history.

(56) References Cited

U.S. PATENT DOCUMENTS

| 5,083,784 | A | 1/1992 | Nilssen | |
|---|---|---|---|---|
| 5,282,620 | A | 2/1994 | Keesee | |
| 6,935,948 | B2 | 8/2005 | Wright | |
| 2003/0228901 | A1* | 12/2003 | Walker et al. | 463/25 |
| 2005/0054430 | A1* | 3/2005 | Pitman et al. | 463/25 |
| 2006/0080237 | A1* | 4/2006 | Mallory | 705/40 |
| 2006/0258426 | A1* | 11/2006 | Seelig et al. | 463/16 |

OTHER PUBLICATIONS

Lottery FAQs Lottery Frequently Asked Questions [online] [retrieved on Dec. 3, 2010] Retrieved from the Internet: <URL:http://www.oregonlottery.org/About/FAQ/>.*

* cited by examiner

*Primary Examiner* — Dmitry Suhol
*Assistant Examiner* — David Duffy
(74) *Attorney, Agent, or Firm* — Verrill Dana, LLP; Chris A. Caseiro

(57) ABSTRACT

A method and system for performing a recurring lottery sustainable by a sustaining pool is claimed and described. In the method of the present invention, a drawing is held. Winners of the drawing receive a jackpot and are required to transfer part of the jackpot to a sustaining pool. Any given jackpot is drawn partially or entirely from the sustaining pool. The system includes one or more electronic devices and may be used to carry out the method.

16 Claims, 2 Drawing Sheets

LOTTERY METHOD AND SYSTEM

CROSS REFERENCE TO RELATED APPLICATION

The present application claims the priority benefit of U.S. provisional patent application Ser. No. 60/927,173, filed May 3, 2007, entitled "SELF SUSTAINING LOTTERY" of the same named inventors. The entire contents of that prior application are incorporated herein by reference.

BACKGROUND OF THE INVENTION

1. Field of the Invention

The present invention relates to a method and a system for conducting a lottery. More particularly, the present invention relates to a method for conducting a recurring lottery that requires winners of the lottery to return part of their winnings to an organizing body of the lottery, wherein the returned winnings are then partially or entirely provided to winners of subsequent lotteries, and a system for conducting the method.

2. Description of the Prior Art

Methods which involve risking something of smaller value for the chance to win something of greater value are common. For example, most states of the U.S. sponsor recurring lotteries that feature a drawing of chance. In these lotteries, each lottery participant typically must pay out a small fee, for example, $1, for the opportunity to win a large cash prize, or "jackpot", which may be up to multiple millions of dollars in value. To win this jackpot, the participant may be required to, for example, match a subset of numbers of the participant's own selection from a larger pool of numbers to a subset of numbers that are later drawn randomly from the pool by lottery officials. Although winners are required to pay taxes on their winnings, they are not required to pay back any of their after-tax winnings into the lottery. In these lotteries, therefore, cash prizes are funded only by the monies risked by participants (and possibly any interest drawn thereupon), with the value of the cash prize for any particular drawing being at least partially dependent upon the amount of money paid into the lottery by the participants of that particular drawing.

One limitation of existing lotteries is that the jackpot value is relatively low when participation is low. Worse, when participation in a particular lottery is low for long stretches of time, the financial health, and therefore the survival, of the lottery is threatened.

Another limitation of existing lotteries is that they do not guarantee that anyone will win any particular drawing of the lottery. This is problematic because it can deter some potential participants from partaking in the lottery. Also, because jackpots that are not won in these existing lotteries are typically "rolled over" until the next drawing, with the jackpot increasing in value each time a roll over occurs, some potential participants may be inclined to wait until the jackpot is rolled over several times before partaking in the lottery.

An improved lottery method therefore would be one that requires cash prize winners to pay a fraction of their winnings back into the lottery. Such a requirement would enable the lottery to be "self-sustaining". This is true because a lottery that is at least partially funded by past winners would be less dependent on future participation. An improved lottery method also would be one that guarantees at least one winner each time a drawing is held. What is needed, therefore, is a lottery method that requires winners to return a portion of their winnings back into the lottery and that guarantees at least one winner each time a drawing is held and a system for conducting that method.

SUMMARY OF THE INVENTION

It is an object of the present invention to provide a method and a system for conducting a lottery. In the method, an organizing body establishes a fund and offers a plurality of chances to win at least a portion of the fund to a plurality of participants, each participant provides money to the organizing body and receives in return one or more of the plurality of chances, the organizing body conducts a drawing to determine one or more winning chances, the organizing body transfers all or a portion of established compensation to each winner, each winner returns a portion of the received established compensation to the organizing body, and the organizing body transfers all or part of the returned portion to a sustaining pool that is, or forms part of, the established fund. These steps are then repeated, with the sustaining pool and the money received from new participants comprising the established fund in the repeated method.

In specific embodiments of the method, the established compensation is a payment made by the organizing body to one or more third-parties for the purpose of partially or entirely fulfilling an obligation owed by the one or more participants under the contract. In a specific embodiment of the method, this contract is a mortgage contract.

In specific embodiments of the method, the portion of the established compensation returned to the organizing body is provided in a single payment, and in other embodiments of the method, the portion of the established compensation returned to the organizing body is provided in a plurality of payments.

The method of the present invention may be incorporated into existing lottery games. For example, participants of both Powerball®, a lottery which is offered by the Multi-State Lottery Association, and Megabucks, a lottery which is offered by the Maine State Lottery Commission, currently are required to match a subset of numbers of the participant's own selection from a larger pool of numbers to a subset of numbers that are later drawn randomly from the pool by lottery officials. These lottery games could be altered to include the steps of the present method.

The system of the present invention may be used to conduct the steps of the method. The system therefore may include, but is not required to include, one or more electronic devices, operable by agents of the organizing body and/or by participants of the present lottery. These electronics devices include, for example, ticket dispensing machines and the Internet. The electronic devices may include computer-executable software stored on a computer-readable medium. The software may be used to conduct one or more steps of the method.

The details of one or more examples related to the invention are set forth in the accompanying drawings and the description below. Other features, objects, and advantages of the invention will be apparent from the following description and accompanying drawings, and the appended claims.

DETAILED DESCRIPTION OF THE PREFERRED EMBODIMENT

Figure 1:
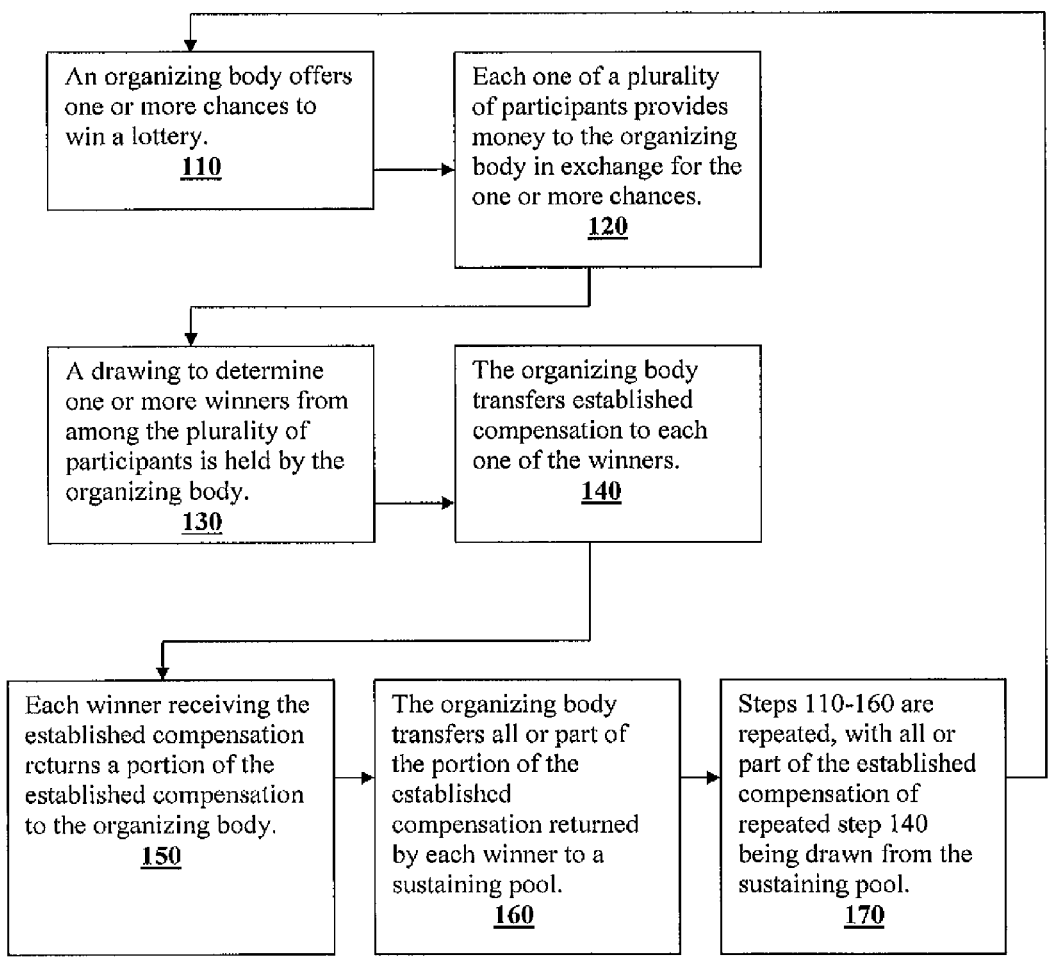
FIG. 1 is a flow diagram showing the steps to be taken for conducting one embodiment of the lottery method of the present invention.

The present invention is a method for conducting a recurring lottery. Generally, in the present lottery method, a plurality of participants in the lottery provide money to an organizing body of the lottery and receive in return one or more chances that are valid for a particular drawing. The organizing body then holds the drawing to determine one or more winners among the plurality of participants. Each winner receives established compensation from the organizing body. Each winner receiving established compensation then returns a portion of the established compensation (this portion has a value that is lower than is the value of the established compensation that was provided to the winner) to the organizing body. All or part of the returned portion is added to a sustaining pool. The method is then repeated a plurality of times, with all or part of the sustaining pool being disbursed to subsequent winners.

One embodiment of a method 100 of performing the lottery is shown in FIG. 1, and includes the steps of 110, offering a plurality of chances to win the lottery by an organizing body; 120, providing money to the organizing body by each one of a plurality of participants, wherein each one of the plurality of participants receives one or more chances to win the lottery in exchange for the money; 130, performing a drawing to determine one or more winners from among the plurality of participants; 140, transferring established compensation by the organizing body to each one of the one or more winners; 150, returning a portion of the established compensation by each one of the one or more winners who receives the established compensation to the organizing body; 160, transferring the returned portion of the established compensation by the organizing body to a sustaining pool, and 170, repeating steps 110, 120, 130, 140, 150 and 160, wherein some or all of the established compensation provided to winners in repeated step 140 is drawn from the sustaining pool.

Figure 2:
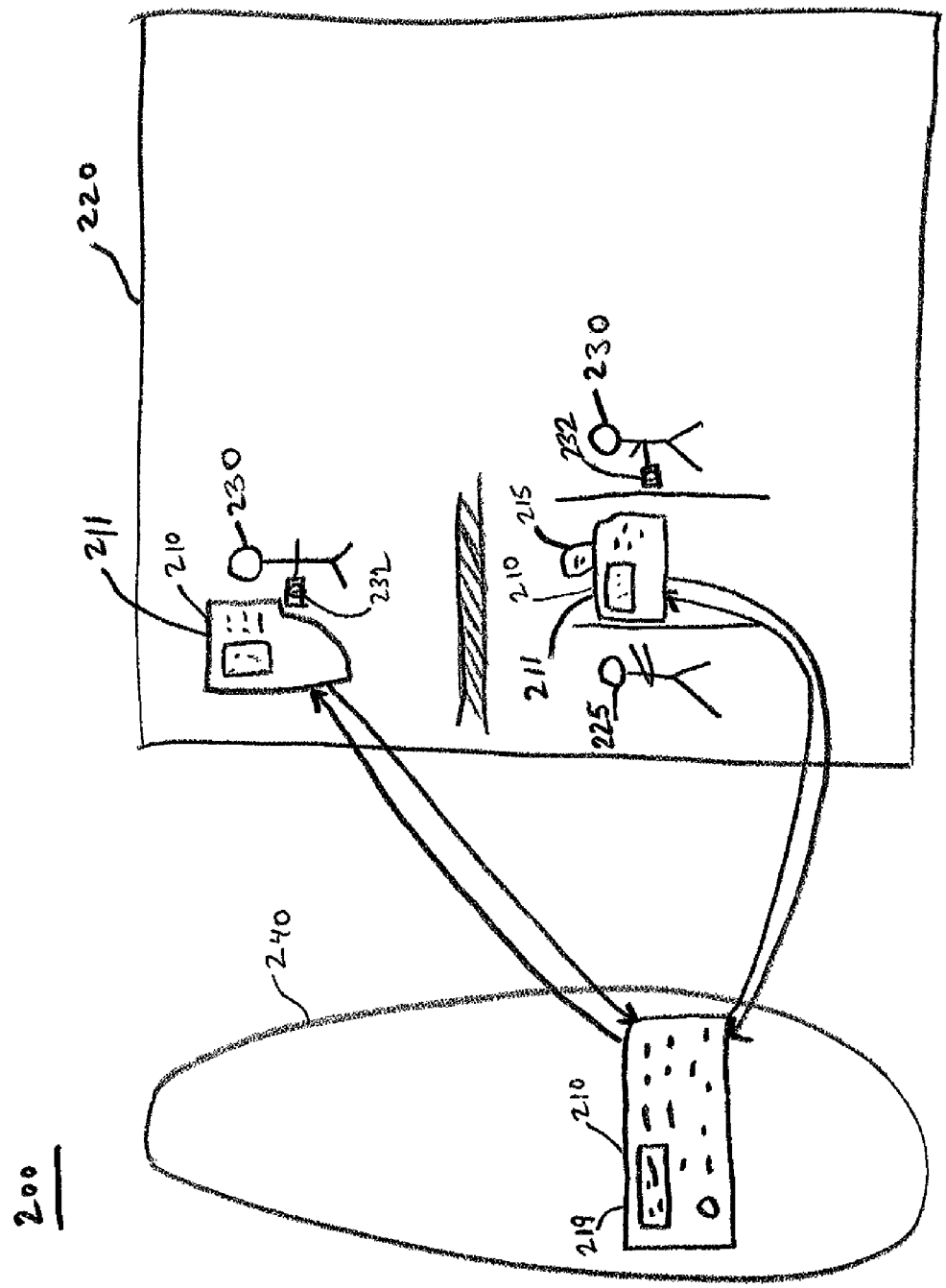
FIG. 2 is a simplified representation of an embodiment of the system of the present invention.

The present invention also includes a system for conducting the method of the present invention. As shown in FIG. 2, in one embodiment, a system 200 includes one or more of the electronic devices 210. Some of the electronic devices 210 are a plurality of ticket dispensing machines 211 located on the premises of a plurality of agents 220. The agents 220 include, for example, convenience stores, grocery stores, gas stations, liquor stores, pubs, and eateries, but are not limited thereto. Some of the ticket dispensing machines 211 are operable by a representative 225 of the agent 220, such as a store clerk/cashier of a convenience store, for example, and some of the ticket dispensing machines 211 are operable by one or more participants 230 of the method. When the ticket dispensing machines 211 are operable by the participant 230, the ticket dispensing machine 211 is capable of receiving money 232 paid by the participant 230 in exchange for one or more tickets 215 and is capable of dispensing the ticket 215. When the ticket dispensing machine 211 is operable by the agent's representative 225, the ticket dispensing machine 211 is capable of dispensing the ticket 215 and is optionally capable of receiving the money 232.

The ticket dispensing machine 211 is in communication with a remote electronic device 219, which is controllable by the organizing body 240. The remote electronic device 219 may be, for example, a computer. The remote electronic device 219 is capable of receiving information from the ticket dispensing machine 211 and sending information to the ticket dispensing machine 211. The remote electronic device 219 also is capable of calculating and storing information regarding the method. This information may be, but is not limited to being, for example, the total number of participants 230 entered for a particular drawing, the total amount of money 232 paid by the participants 230 to enter that particular drawing, the identifying features associated with any particular ticket 215, and the number of winners that will be determined for that particular drawing. The remote electronic device 219 also may be capable of directing the ticket dispensing machine 211 to print out a ticket 215 having the identifying features and any other information that may be on the face of the ticket 215, such as the time and date of the drawing for which the ticket 215 is valid and the money 232 paid by the participant 230 holding the ticket in exchange for the ticket 215, for example.

The system 200 of the present invention further includes computer-executable software stored on a computer-readable medium, the computer-executable software being capable of being used to conduct one or more steps of the method. For example, the software may be included as part of the ticket dispensing machine 211 and the remote electronic machine 219.

The computer-executable software includes computer-readable signals tangibly embodied on the computer-readable medium, where such signals define instructions for processing data entered by the representative 225 of the agent or by the participant 230 or received from the organizing body 240. Such instructions may be written in any of a plurality of programming languages, for example, Java, XML, Visual Basic, C, or C++, Fortran, Pascal, Eiffel, BASIC, COBOL, and the like, or any of a variety of combinations thereof. The computer-readable medium on which such instructions preferably reside is to be compatible with a central processing unit of both the ticket dispensing machine 211 and the remote electronic machine 212.

DEFINITIONS AND SCOPE OF TERMS

Unless otherwise indicated, such as through context, as used herein, the following terms are intended to have the following meanings in interpreting the present invention.

The "organizing body" is any entity that is lawfully permitted to perform the steps required of the organizing body of the method of the invention. An example of an organizing body includes, but is not limited to being, a government body, such as a state government body, for example.

The "organizing body" also optionally may be an agent that is authorized to act on behalf of the organizing body. The agent may be, but is not limited to being, a business entity, such as a convenience store, a grocery store, a gas station, a liquor store, a pub, or an eatery, for example.

When the agent participates in the method, the agent may collect the money from the participant and dispense the chance to the participant according to any manner by which the organizing body may do the same. Whenever the agent receives the money from the participant, the agent then provides the one or more chances to the participant and then provides all or part of the money to the organizing body.

The "participant" is any individual who is lawfully permitted to participate in the method of the present invention. The participant therefore may be, for example, a mentally competent adult individual over the age of 18.

The "chance" represents a single opportunity to win the established compensation. Any particular participant may obtain any number of chances to win the established compensation. Each chance is characterized by one or more identifying features. Preferably, each chance is characterized by a unique identifying feature or unique set of identifying features. Preferably, the identifying feature or set of identifying features, whether unique or not, are included on a "ticket". The ticket may be a small slip of paper, for example. The ticket also may be a paper copy of an electronic display, such as an Internet web page screen shot printed by a computer printer, for example, and may even be the electronic display itself or any other reproduction thereof, such as a photograph thereof, for example. The ticket may be any device that is capable of confirming the identity or identities of the identifying feature or set of identifying features.

The "identifying features" are any features, such as numbers, letters, icons, participant name, or participant social security number, for example, that may be used to determine the winners among the participants through the drawing.

The "winner" is any participant who holds a ticket which identifies the winning chance or who in some other way can prove that he/she received a winning chance from the organizing body.

The "winning chance" is any chance that the organizing body deems to be a winning chance after performing the drawing. In any particular lottery, there may be one or more winning chances. A "winning number", such as is described in the Example below, is a "winning chance".

The "drawing" is any method by which the organizing body identifies a particular chance as being a winning chance. The drawing may, for example, generate one or more of the identifying features or set of identifying features. The drawing also may be a series of drawings. A specific example of the drawing is provided in the Example described below but is not limited thereto. For example, in addition to the drawing described in the Example, the drawing may be carried out by using a random number generator, which may be a computer and a computer program, for example, but is not limited thereto.

The "money" and the "returned portion of the established compensation" provided to the organizing body by the winner preferably are cash currency. "Money" includes credit and debit card payment, transfers of funds to and from bank accounts, and negotiable instruments.

The "established compensation" may be money. The established compensation also may be a payment made by the organizing body toward the partial or entire fulfillment of a sum that a winner is contractually obligated to pay. For example, the sum may be a mortgage that a winner is obligated to pay to a third-party pursuant to a mortgage contract. When the established compensation is a payment made by the organizing body toward the partial or entire fulfillment of a sum that a winner is contractually obligated to pay, the winner may be required to return a portion of that payment to the organizing body in installment payments. (This payment by the winner to the organizing body is the "returned portion of the established compensation".) For example, the total amount returned by the winner to the organizing body may be equal to one-half of the value of the established compensation. Further, the winner may be required to return this amount to the organizing body in, for example, monthly installments that are equal to, for example, one-half of the amount that the winner had been required to provide to the third-party each month. The invention therefore allows for the possibility that the total amount a winner is obligated to pay to a third-party under a mortgage contract will be reduced, and also allows for the possibility that the amount of each installment payment that the winner is required to pay under such a contract will be reduced.

Further, the established compensation may be divisible and won by one or more winners of a particular drawing. When there is only one winner for a particular drawing, that winner may receive the entire established compensation. When there is more than one winner, each winner may receive a fraction of the established compensation. Further, the fraction that each winner receives may be equal to the inverse of the number of winners of the lottery. For example, when there are five winners, each winner may receive ⅕, or 20%, of the established compensation.

The "jackpot" may be all or a portion of the established compensation. For example, when there is only one winner (i.e., the established compensation is not to be divided), that winner wins the jackpot, and when there are a plurality of winners (i.e., the established compensation is to be divided), those winners win the jackpot. The organizing body may increase the value of the jackpot by using the sustaining pool. The organizing body may predetermine the number of winners for any particular drawing based upon the value of the jackpot and/or the total value of the tickets sold for that drawing.

The money has a value that is less than the values of each of the established compensation and the returned portion of the established compensation, and the returned portion of the established compensation has a value that is less than the established compensation.

The "electronic device" is any electronic device that is capable of dispensing the chances and may also be capable of, but need not be capable of, receiving the money. Therefore, the electronic device may be, but is not limited to being, a computer or a computerized machine, such as a ticket vending machine or ticket dispensing machine, which either or both of the organizing body or the participant may use to perform the method of the invention. The electronic device further may be a remote computer controllable by the organizing body. The electronic device also may be the Internet. When the electronic device is the Internet, either or both of the organizing body or the participant is able to use the Internet to perform the method of the invention. Further, the electronic device may be a plurality of electronic devices. For example, the electronic device may be the Internet, a computer capable of accessing the Internet, and a keyboard, a mouse, a display monitor and a printer, each of which are connected to the computer. Examples of such electronic devices that may be used for this purpose are well known to those of ordinary skill.

The "sustaining pool" is one or more returned portions of the established compensation. The sustaining pool may be a bank account, such as a high-interest bank account, for example, into which the returned portions of the established compensation may be deposited.

The method and the system of the present invention are more specifically described with reference to a specific Example; however, they are not to be construed as being limited thereto.

EXAMPLE

An organizing body, which is a state government body, offers a plurality of chances, which are tickets, through a plurality of agents authorized to act on behalf of the organizing body for either five dollars per chance ("a $5 chance") or one dollar per chance (a "$1 chance"). Collectively, these agents are convenience stores, grocery stores, gas stations, liquor stores, pubs, and eateries. The tickets are dispensable by human representatives of the agents and by ticket dispensing machines made available to the participants by the agent according to any of the manners described herein or by those manners known to those of ordinary skill in the art. The tickets are also available to the participants via the Internet. The offer of the tickets states that each ticket is valid for a drawing to win a jackpot to be held on at 8:00 p.m. (EDT) on March 19th of a defined year ("the March 19th drawing", or in this Example only, "the drawing"). The offer further states that anyone deemed to be a winner of the March 19th drawing holding a winning $5 chance will receive a maximum jackpot of $450,000 and any winner of the March 19th drawing holding a winning $1 chance will receive a jackpot of $50,000. Specifically, the offer states that those winners holding a winning $5 ticket who have a mortgage on a primary residence will receive the lesser of the balance of their mortgage or $450,000, and the offer further states that any winner holding a winning one dollar chance will receive $50,000 regardless of whether he/she has a mortgage on a primary residence. The offer still further states any other information required by law to make the offer a legal offer, the acceptance of which by a participant creates a valid contract between the participant and the state government body.

Each ticket sold includes on its face at least one unique eight-digit number ("the first set of identifying features"), with each eight-digit number corresponding to one chance. Accordingly, no two or more tickets that are valid for the March 19th drawing have the same eight-digit number. Each ticket sold also includes the date and time of the drawing (March 19th at 8:00 p.m. EDT). Each ticket further includes any other information required by law.

Prior to the March 19th drawing, a first participant, "Ultimate Winner 1", enters a grocery store and requests a $5 ticket from the store clerk. The clerk, by interacting with a keypad on a ticket dispensing machine, then requests the $5 ticket from the electronic device, and the ticket dispensing machine then prints the ticket that is valid for the March 19th drawing. This ticket has on its face a unique eight-digit number, which is 00056233. In return for the ticket, Ultimate Winner 1 pays the clerk five dollars. The grocery store keeps 50 cents of the five dollars it receives from Ultimate Winner and provides the remaining $4.50 to the state government body. Data regarding the ticket and the transaction between the agent and the participant are stored on a remote computer under the control of the state government body.

Prior to the March 19th drawing, a second participant, "Ultimate Winner 2", accesses the state government body's web page on the Internet from her home computer and, using her credit card, purchases three $5 chances according to the instructions provided on the web page. As a result of this purchase, three unique eight-digit numbers, which are 00103905, 00103906 and 00103907, appear on the display screen of the computer Ultimate Winner 2 then prints out a copy of the web page showing these three eight-digits numbers onto paper by using the printer connected to her computer. The printed copy of the web page, which has on its face all three of the unique eight-digit numbers, 00103905, 00103906 and 00103907, serves as Ultimate Winner 2's ticket. The state government body keeps the entire $15 paid to it by Ultimate Winner 2. Data regarding the ticket and the transaction between the agent and the participant are stored on a remote computer under the control of the state government body.

Prior to the March 19th drawing, a third participant, "Ultimate Winner 3", enters a liquor store, approaches a ticket dispensing machine and feeds a $10 bill into a money-receiving slot of the machine. The machine then asks Ultimate Winner 3, via a display screen, to indicate, via a keypad, the price and quantity of the tickets that he wants to purchase. Using the keypad, Ultimate Winner 3 indicates that he wants to purchase a single $1 ticket. The machine then prints a unique eight-digit number, which is 00126859, onto a slip of paper, which becomes Ultimate Winner 3's ticket, and dispenses that ticket to Ultimate Winner 3 for his possession. The machine then provides $9 in change to Ultimate Winner 3. The liquor store keeps $0.10 of the $1 it receives from Ultimate Winner and provides the remaining $0.90 to the state government body. Data regarding the ticket and the transaction between the agent and the participant are stored on a remote computer under the control of the state government body.

Prior to the March 19th drawing, a plurality of other participants, "Ultimate Non-winners", obtain tickets from the various agents of the state government body according in any manner permitted by the invention as described herein. Each ticket held by Ultimate Non-winners has a unique eight-digit number and is valid for the March 19th drawing.

One hour prior to the March 19th drawing, the state government body closes all further entry to that drawing and determines that it has collected $1.10 million from the participants of that drawing. The state government body adds $250,000 from the sustaining pool of this Example (the sustaining pool of this Example is described below) to the $1.10 million to bring the total value of the jackpot that it offers in the March 19th drawing to $1.35 million. Based on the total amount of money that participants paid for the tickets to participate in the March 19th drawing, the state government body determines that there will be three winners in the drawing. [The number of winners is determined by the total value of the jackpot ($1.35 million) divided by the maximum payout to any particular winner ($450,000).]

The state government body holds the drawing on March 19th at 8:00 p.m. EDT to determine three winning numbers. This drawing is made available to the public for real-time observation on "live" television. A device used to conduct the drawing includes eight transparent aerated bins, each bin having a tube and up to 10 lightweight balls of equal dimension and weight wherein each of the balls includes on its face a different number. Since it is known that there are 291,455 outstanding chances held by participants of the March 19th drawing, each winning number must be equal to 00000001 or 00291455 or must be any number between 00000001 and 00291455. Therefore, because each of the first two positions of each winning number must be "0", the first two bins of the eight bins includes only a ball showing the number "0". Further, since the third position of each winning number must be "0", "1" or "2", the third bin contains only three balls: one showing "0", one showing "1" and one showing "2". Each one of the remaining five bins has 10 balls, wherein each of the balls includes on its face a different number (0-9). The balls are then mixed by aeration within each bin, and one ball is randomly fed into each tube by aeration. Each one of the balls drawn into the tubes of the first three bins has a "0" on its face, the ball drawn into the tube of the fourth bin has a "5" on its face, the ball drawn into the tube of the fourth bin has a "5" on its face, the ball drawn into the tube of the fifth bin has a "6" on its face, the ball drawn into the tube of the sixth bin has a "2" on its face, and each one of the balls drawn into the seventh and eight bins has a "3" on its face. Therefore, the first winning number drawn is "00056233".

The balls in the tubes are then released into their respective bins and are mixed by aeration, with the process of drawing one ball into each of the eight bins being repeated. The winning number generated by this second drawing is "00232551". The balls in the tubes are then released into their respective bins and are mixed by aeration, with the process of drawing one ball into each of the eight bins being repeated. The winning number generated by this third drawing is "00103907". The three winning number of the March 19th drawing therefore are 00056233, 00103907 and 00232551.

The ticket held by Ultimate Winner 1 has the eight-digit number 00056233, the ticket held by Ultimate Winner 2 has the eight-digit number 00103907 (and two "non-winning" numbers), and the ticket held by Ultimate Winner 3 has the eight-digit number 00232551. Each one of these participants, therefore, is a winner of the jackpot for the March 19$^{th}$ drawing and each one is entitled to receive a share of the established compensation from the state government body.

None of the tickets held by Ultimate Non-winners valid for the March 19$^{th}$ drawing includes any one of the winning numbers, 00056233, 00103907, or 00232551. Therefore, none of the Ultimate Non-winners is a winner and none are entitled to collect the jackpot from the state government body.

After the March 19 h drawing is completed, Ultimate Winner 1 presents the $5 ticket having the winning number 00056233 and a document showing proof of mortgage to the state government body, and the state government body inspects the ticket and the mortgage document to confirm the authenticity of each one. The state government body also confirms that the property described in the mortgage document is actually the primary residence of Ultimate Winner 1. The outstanding balance shown on the proof of mortgage document is $345,944.81. (Therefore, under terms of the offer, the state government body is obligated to pay the entire outstanding balance of this mortgage.) The organizing body then provides an offer to form a contract to Ultimate Winner 1. This offer, if agreed to by Ultimate Winner 1, would require the organizing body to pay $345,944.81 to the holder of the mortgage and would allow it to place a lien on the property described in the mortgage. Further, according to the offer, Ultimate Winner 1 would be required to pay back $125,000, to the organizing body in 125 monthly installments of $1,000 each (wherein the lien would be removed upon payment of the 125$^{th}$ installment). Ultimate Winner 1 agrees to this offer. The organizing body pays $345,944.81 to the mortgage holder, places a lien on the property described in the mortgage, and receives the first of the 125 monthly installments from Ultimate Winner 1. The $1,000 received as the first of the 125 monthly installments is placed into a high-interest bank account, which is the "sustaining pool".

After the March 19$^{th}$ drawing is completed, Ultimate Winner 2 presents the $5 ticket having the winning number 00103907 and a document showing proof of mortgage to the state government body, and the state government body inspects the ticket and the mortgage document to confirm the authenticity of each one. The state government body confirms that the property described in the mortgage document is not actually the primary residence of Ultimate Winner 2. The state government body determines that it cannot pay Ultimate Winner 2's mortgage (because it is for a non-primary residence) and inspects the ticket to confirm the authenticity of the ticket. Upon confirming the authenticity of the ticket, the state government body transfers a check payable to Ultimate Winner 2 in the amount of $50,000 (the minimum payment) to Ultimate Winner 2.

After the March 19$^{th}$ drawing is completed, Ultimate Winner 3 presents the $1 ticket having the winning number 00232551 to the state government body. The state government body inspects the ticket to confirm the authenticity of the ticket. Upon confirming the authenticity of the ticket, the state government body transfers a check payable to Ultimate Winner 3 in the amount of $50,000 to Ultimate Winner 3.

The state government body offers chances, which are purchased by a plurality of participants, as described above for a second drawing, to be held on March 26$^{th}$ of the same year that the March 19$^{th}$ drawing was held. (This drawing is the "March 26$^{th}$" drawing.) The state government body further determines that there are 800 past winners (i.e., Ultimate Winner 1 of the March 19$^{th}$ drawing or any winner of a drawing held prior to the March 19$^{th}$ drawing that is required to return a portion of the established compensation) that are actively making installment payments into the sustaining pool. The state government body adds $10, drawn from the sustaining pool, to the jackpot of a particular drawing for each one of these past winners who is actively paying into the sustaining pool. Therefore, the state government body adds $8,000 to the jackpot of the March 26$^{th}$ drawing. The 800 past winners cannot win the jackpot of the March 26$^{th}$ drawing unless they purchase a chance that becomes a winning chance in the March 26$^{th}$ drawing.

Interest gained on monies held in the sustaining pool are used by the state government body for public good. For example, some of this interest money is used to fund state-sponsored and private organizations and programs that are aimed at, for example, fighting the problem of homelessness. Some of this interest money is also held by the state government body in a general fund for future allocation. Some of this interest money is also disbursed to winners of future drawings.

While the present invention has been described with particular reference to certain embodiments of the method and system, it is to be understood that it includes all reasonable equivalents thereof as defined by the following appended claims.

What is claimed is:

1. A computer-implemented method of conducting a lottery using a computer and software executable on the computer, the computer-implemented method comprising the steps of:
   a. executing on the computer instructions to offer a plurality of chances through an organizing body;
   b. providing to each one of a plurality of participants one or more of the plurality of chances to win the lottery in exchange for money;
   c. executing on the computer instructions to conduct a drawing to identify one or more winning chances from among the plurality of chances;
   d. transferring all or a first portion of established compensation from the organizing body to at least one of the one or more participants who received at least one of the one or more winning chances;
   e. requiring the at least one of the one or more participants to return a second portion of the established compensation to the organizing body, wherein the second portion is less than the all or the first portion transferred in step (d);
   f. transferring all or a third portion of the returned second portion to a sustaining pool; and
   g. repeating steps (a)-(f), wherein some or all of the established compensation in repeated step (d) is from the sustaining pool.

2. The method of claim 1 wherein the established compensation has a value that is determined prior to the drawing.

3. The method of claim 1 wherein the established compensation is a payment made by the organizing body to one or more third-parties for the purpose of partially or entirely fulfilling an obligation owed by the at least one of the one or more participants.

4. The method of claim 3 wherein the obligation is a mortgage contract.

5. The method of claim 1 wherein the number of the winning chances is determinable by the organizing body prior to the drawing.

6. The method of claim 5 wherein the number of winning chances determined by the organizing body is based on the total value of the money provided to the organizing body by the plurality of participants or is based on the value of the established compensation.

7. The method of claim 1 wherein the value of the established compensation is determinable by the organizing body prior to the drawing.

8. The method of claim 1 wherein the value of the second portion of the established compensation returned to the organizing body by the at least one of the one or more participants receiving the established compensation is one-half of the value of the established compensation.

9. The method of claim 1 wherein the second portion of the established compensation returned to the organizing body by the at least one of the one or more participants receiving the established compensation is provided to the organizing body in a single payment.

10. The method of claim 1 wherein the second portion of the established compensation returned to the organizing body by the at least one of the one or more participants receiving the established compensation is provided to the organizing body in a plurality of payments.

11. The method of claim 1 wherein all or part of the sustaining pool is held in an interest-bearing account.

12. The method of claim 1 wherein the plurality of chances are offered by one or more agents of the organizing body.

13. The method of claim 12 wherein the one or more agents are selected from the group consisting of convenience stores, grocery stores, gas stations, liquor stores, pubs, and eateries.

14. A system for conducting a lottery comprising one or more ticket dispensing machines and a computer arranged to execute software, wherein the computer is configured to perform the steps of:

a. offering through an organizing body a plurality of chances;
b. providing to each one of a plurality of participants through the one or more ticket dispensing machines one or more of the plurality of chances to win the lottery in exchange for money;
c. conducting a drawing to identify one or more winning chances from among the plurality of chances;
d. transferring all or a first portion of established compensation from the organizing body to at least one of the one or more participants who received at least one of the one or more winning chances;
e. requiring the at least one of the one or more participants to return a second portion of the established compensation to the organizing body, wherein the second portion is less than the all or the first portion transferred in step (d);
f. transferring all or a third portion of the returned second portion to a sustaining pool; and
g. repeating steps (a)-(f), wherein some or all of the established compensation in repeated step (d) is from the sustaining pool.

15. The system of claim 14 wherein the computer is controllable by the organizing body.

16. The system of claim 14 wherein the computer is controllable by the organizing body, and wherein the computer is in communication with the one or more ticket dispensing machines controllable by one or more agents of the organizing body.

* * * * *